United States Patent
Hyun

(10) Patent No.: US 9,693,542 B2
(45) Date of Patent: Jul. 4, 2017

(54) FISHING REEL EQUIPPED WITH DECO TRIM AND DRAIN

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

(*) Notice: Subject to any disclaimer, the term of this patent is extended or adjusted under 35 U.S.C. 154(b) by 0 days.

(21) Appl. No.: 15/209,004

(22) Filed: Jul. 13, 2016

(65) Prior Publication Data
US 2017/0013817 A1 Jan. 19, 2017

(30) Foreign Application Priority Data
Jul. 17, 2015 (KR) .................. 10-2015-0101425

(51) Int. Cl.
*A01K 89/01* (2006.01)

(52) U.S. Cl.
CPC .... *A01K 89/0102* (2013.01); *A01K 89/01121* (2015.05)

(58) Field of Classification Search
CPC A01K 89/01; A01K 89/01121; A01K 89/015; A01K 89/0192; A01K 89/01921
See application file for complete search history.

(56) References Cited

U.S. PATENT DOCUMENTS

| | | | | |
|---|---|---|---|---|
| 4,681,276 A | * | 7/1987 | Sato | A01K 89/015 242/249 |
| 4,805,849 A | * | 2/1989 | Nanbu | A01K 89/015 242/271 |
| 6,189,258 B1 | * | 2/2001 | Anderson | A01K 97/00 206/315.11 |
| 6,460,793 B1 | * | 10/2002 | Hirayama | A01K 89/015 242/313 |
| 7,845,590 B2 | * | 12/2010 | Ikuta | A01K 89/033 242/296 |
| 8,296,992 B1 | * | 10/2012 | Caviness | A01K 91/02 141/331 |
| 2004/0140163 A1 | * | 7/2004 | Ikuta | A01K 89/01555 188/158 |
| 2006/0006267 A1 | * | 1/2006 | Hirayama | A01K 89/015 242/223 |
| 2009/0094881 A1 | * | 4/2009 | Konopa | A01K 97/06 43/57.1 |

(Continued)

FOREIGN PATENT DOCUMENTS

| | | | |
|---|---|---|---|
| JP | 2003079286 A | * 3/2003 | ........... A01K 89/015 |
| KR | 200305929 | 3/2003 | |
| KR | 200462258 | 9/2012 | |

*Primary Examiner* — Emmanuel M Marcelo
(74) *Attorney, Agent, or Firm* — Cantor Colburn LLP

(57) ABSTRACT

A fishing reel with a deco trim and a drain includes: a frame; a shaft mounted on the frame; a spool fitted on the shaft to wind a fishing line; a first side cover disposed on a side of the frame; and a second side cover disposed on the opposite side to the first side cover, coupled to the frame, and capable of opening to separate the spool. The fishing reel further includes a mounting portion formed at one or both of the first side and second side covers, a deco trim coupled to the mounting portion, and a drain formed on the first side cover, the second side cover, the deco trim, or the frame to discharge water between the deco trim and the first side cover or the second side cover.

3 Claims, 8 Drawing Sheets

(56) References Cited

U.S. PATENT DOCUMENTS

2010/0084499 A1\* 4/2010 Hirayama ............ A01K 89/033
 242/303
2011/0057063 A1\* 3/2011 Kawasaki ............ A01K 89/015
 242/283

\* cited by examiner

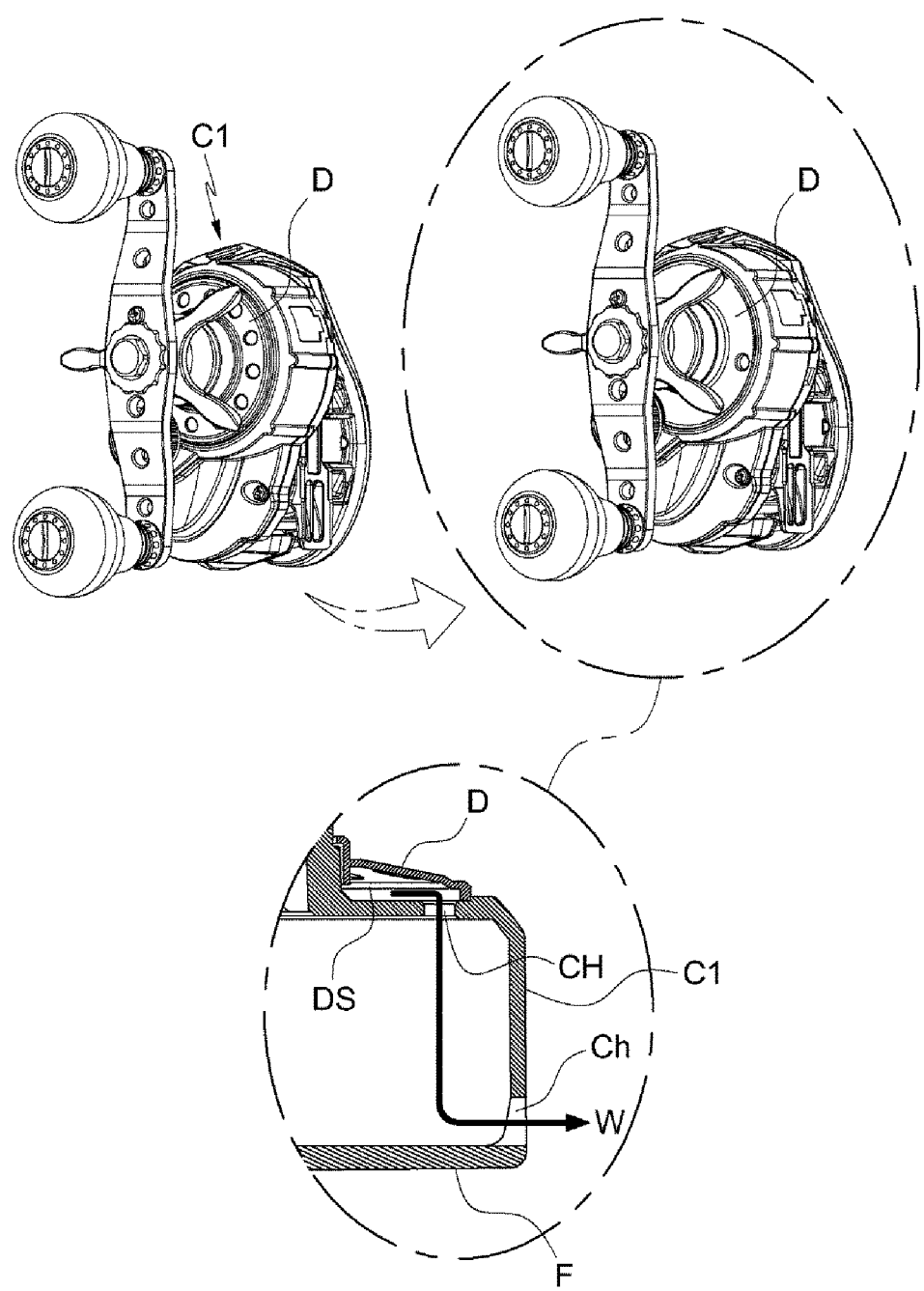

FISHING REEL EQUIPPED WITH DECO TRIM AND DRAIN

CROSS REFERENCE TO RELATED APPLICATION

The present application claims priority to Korean Patent Application No. 10-2015-0101425, filed Jul. 17, 2015, the entire contents of which is incorporated herein for all purposes by this reference.

BACKGROUND OF THE INVENTION

Field of the Invention

The present invention relates to a fishing reel equipped with a deco trim and a drain. More particularly, the present invention relates to a fishing reel having a drain with various and gorgeous colors and shapes on a gear-side first side cover or a palm-side second side cover in order to prevent a reel, a deco trim, and a deco trim screw from being corroded due to seawater, which remains between the deco trim and the side covers without being quickly discharged, and prevent the deco trim from coming off and separating due to accumulation of salt.

Description of the Related Art

Deco trims having various and gorgeous colors are applied to fishing reels to improve decorative effects.

In particular, deco trims are disposed on a gear side cover, that is a first side cover, or a palm side cover, that is, a second side cover, and if necessary, they are replaced to provide new esthetic effects and prevent the reel from becoming boring.

In order to fix deco trims, an adhesive, screws, an integrated type hook, or forcible fitting are used.

Seawater unavoidably flows in between side covers and a deco trim during fishing, and if the seawater remains without being quickly discharged, it corrodes the reel, the deco trim, and deco trim screws, etc. As this phenomenon is repeated, salt is accumulated, so the deco trim separates and comes off.

In the related art, in order to solve the problems due to seawater remaining on fishing reels, there is Korean Utility Model No. 20-0305929, titled "Water tight structure of spinning reel for fishing" (registered on Feb. 17, 2003).

This document has proposed a technology that can prevent breakdown, extend the lifespan, provide ease of manufacture, and reduce the manufacturing cost of a fishing reel by improving watertightness by disposing a gasket and a sealing ring at portions where a drag knob of a spool is mounted, a pinion and drive gear bearing are installed, and a body flange is formed.

Further, there is Korean Utility Model No. 20-0462258, titled "Bait casting reel with water-proof structure for drag washer" (registered on Aug. 28, 2012).

This document has proposed a technology that greatly increases durability of a drag washer by applying a waterproof structure that prevents damage to the drag washer due to seawater by preventing seawater from flowing into the drag washer.

However, these technologies are both related to a waterproof structure, but are not to a technology for quickly discharging seawater, which has already flowed in a fishing reel, outside the fishing reel, and they are not related to particularly a deco trim.

SUMMARY OF THE INVENTION

The present invention has been made in an effort to solve the problems and an object of the present invention is to provide a fishing reel having a drain with a variety of gorgeous colors and shapes on a gear side first side cover or a palm side second side cover in order to prevent a reel, a deco trim, and a deco trim screw from being corroded due to seawater, which remains between the deco trim and the side covers without being quickly discharged, and prevent the deco trim from separating and coming off due to salt accumulated by repetition of this phenomenon.

Further, the present invention provides a fishing reel that makes it possible to quickly dry seawater and washing water by forming external-air holes in a deco trim, in addition to discharging them.

Further, the present invention provides a fishing reel that naturally guides water on a deco trim outside side cover areas by making an inclined portion that declines a deco trim toward the outer edge.

Further, the present invention provides a fishing reel that minimizes a space between a deco trim and a side cover, where salt accumulated by drying easily collects, by forming a recessed portion on a mounting portion to receive the outer edge of the deco trim, and that prevents the end of the deco trim from separating from the top of a side cover even if it minutely comes off due to accumulation of salt.

Further, the preset invention provides a fishing reel that can more easily discharge water and can be more easily dried by forming a space between a deco trim and side covers.

In order to achieve the above object, according to one aspect of the present invention, there is provided a fishing reel equipped with a deco trim and a drain, the fishing reel including: a frame; a shaft mounted on the frame; a spool fitted on the shaft to wind a fishing line; a first side cover disposed on a side of the frame; and a second side cover disposed on the opposite side to the first side cover, coupled to the frame, and capable of opening to separate the spool, and the fishing reel further including a mounting portion formed at one or both of the first side and second side covers, a deco trim coupled to the mounting portion, and a drain formed on the first side cover, the second side cover, the deco trim, or the frame to discharge water between the deco trim and the first side cover or the second side cover.

External-air holes may be formed through the deco trim.

The deco trim may have an inclined portion declining toward an outer edge, and the mounting portion may have a recessed portion receiving the outer edge of the deco trim.

A space may be defined between the deco trim and the first side cover or the second side cover.

According to the present invention, since a fishing reel is equipped with a deco rim, which has a variety of gorgeous colors and shapes, and a drain on a gear-side first side cover or a palm-side second side cover, it is possible to prevent a reel, a deco trim, and a deco trim screw from being corroded due to seawater, which remains between the deco trim and the side covers without being quickly discharged, and prevent the deco trim from separating and coming off due to accumulation of salt.

Further, since external-air holes are formed through the deco trim, it is possible to quickly dry seawater and washing water in addition to discharging them. Furthermore, since the deco trim has an inclined surface declining toward the outer edge of the deco trim, it is possible to naturally guide water on a deco trim outside side cover areas, whereby it is possible to prevent damage due to seawater.

Further, it is possible to minimize a space between a deco trim and a side cover, where salt accumulated by drying easily collects, by forming a recessed portion on a mounting portion to receive the outer edge of the deco trim, and to prevent the end of the deco trim from separating from the top of a side cover even if it minutely comes off due to accumulation of salt.

BRIEF DESCRIPTION OF THE DRAWINGS

The above and other objects, features and other advantages of the present invention will be more clearly understood from the following detailed description when taken in conjunction with the accompanying drawings, in which:

FIGS. 1A, 1B, 2A, 2B, 3A, 3B, 4A and 4B are views showing fishing reels having various deco trims and drains.

DETAILED DESCRIPTION OF THE INVENTION

Figure 1A:
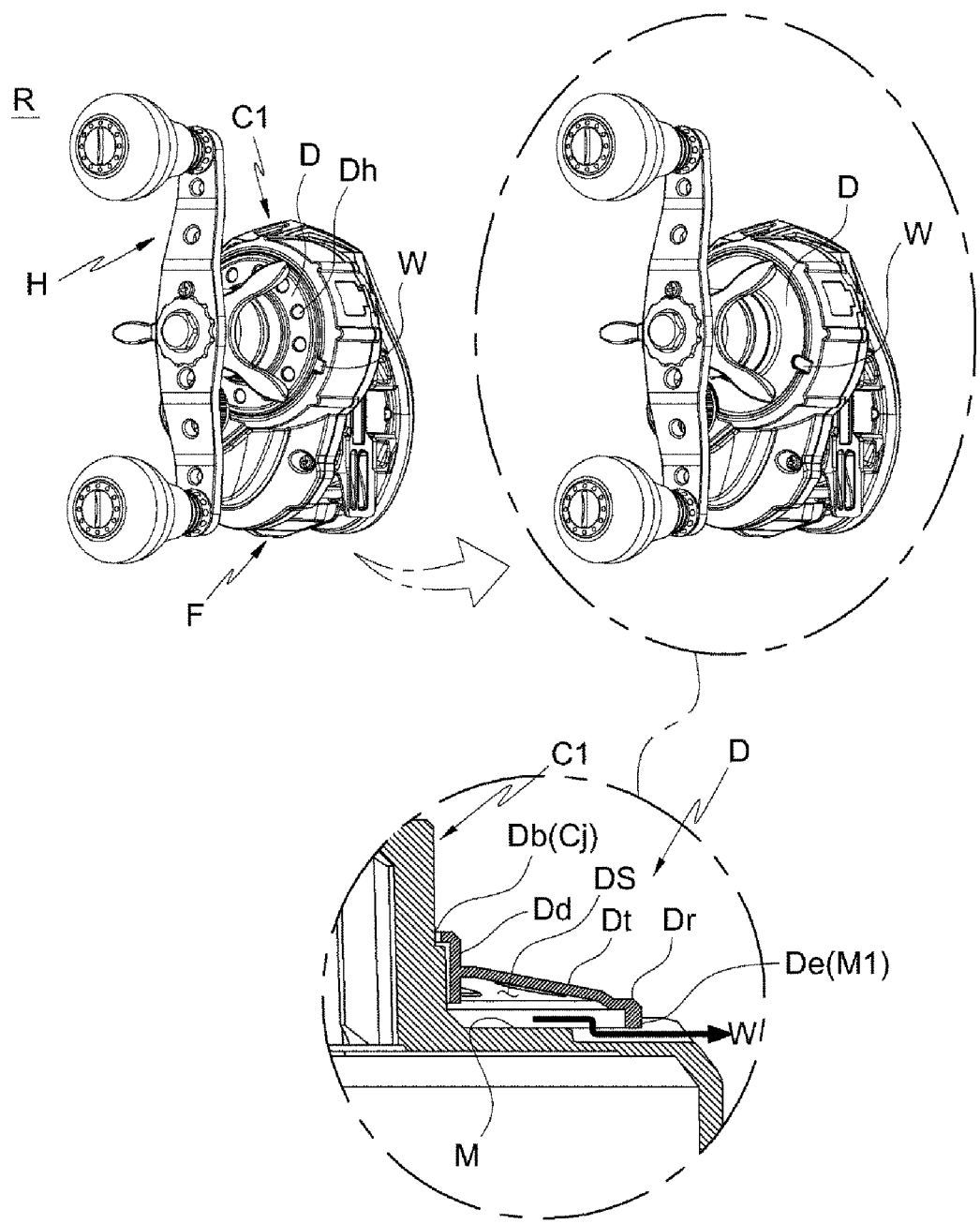

The present invention is described hereafter in detail with reference to the accompanying drawings.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention. However, it is to be understood that the present invention is not limited to the specific exemplary embodiments, but includes all modifications, equivalents, and substitutions included in the spirit and the scope of the present invention.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present invention should not be interpreted narrowly.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

In the following description, when it is determined that well-known function and configuration may unnecessarily make the spirit of the present invention unclear, they will not be described.

Terms such as 'a first ~' and 'a second ~' are used only for the purpose for distinguishing a constitutive element from other constitutive elements, but constitutive element should not be limited to a manufacturing order, and the terms described in the detailed description of the invention may not be consistent with those described in the claims.

FIGS. 1A, 2A, 3A, and 4A show deco trims and drains at first side covers C1 and FIGS. 1B, 2B, 3B, and 4B show deco trims and drains at second side covers C2.

Further, in each of FIGS. 1A, 2A, 3A, and 4A and FIGS. 1B, 2B, 3B, and 4B, the first and second ones are perspective view and the third ones are cross-sectional views enlarging main parts.

Figure 1B:
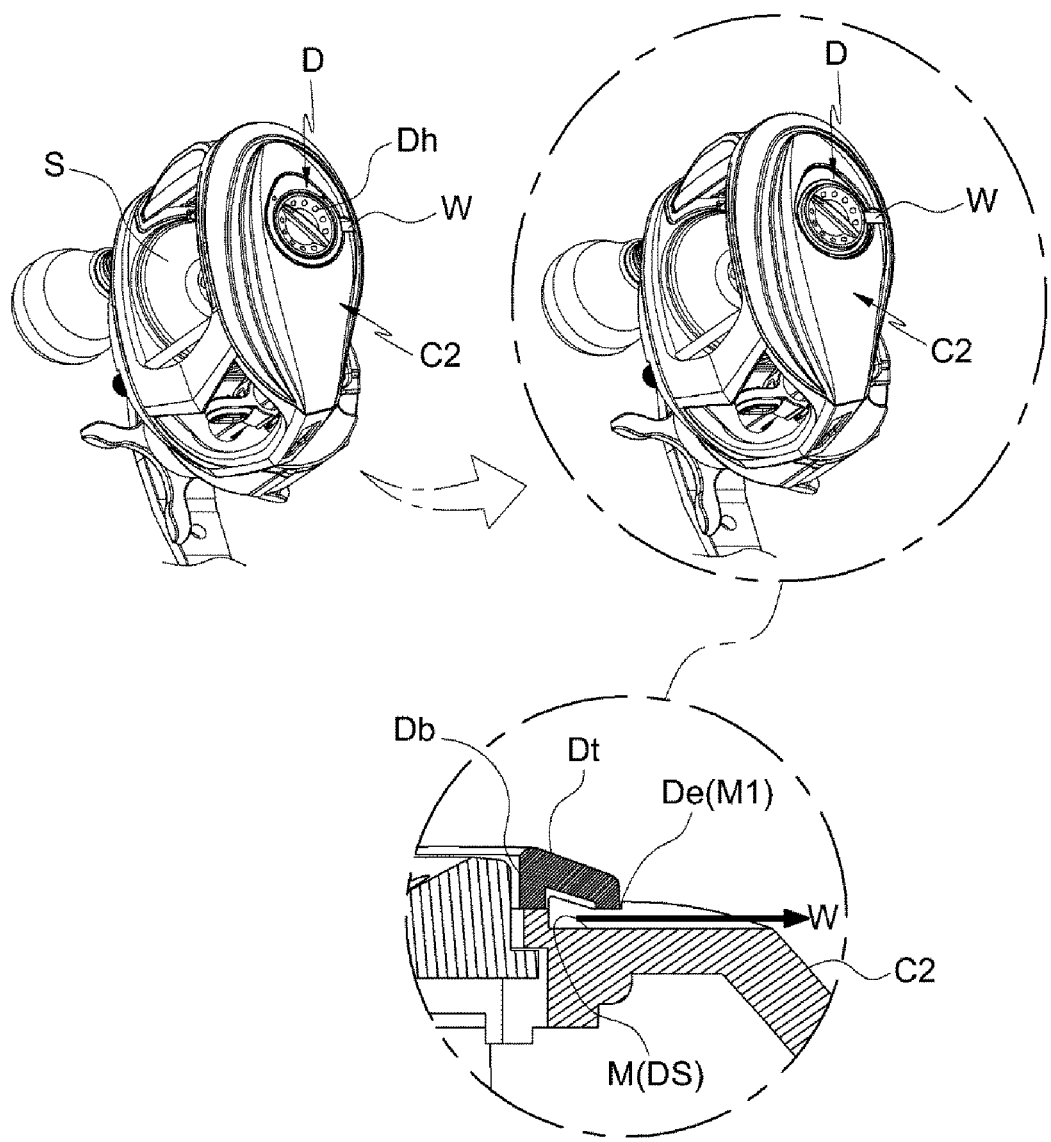

First, as shown in FIGS. 1A and 1B, a fishing reel R equipped with a deco trim and a drain according to the present invention largely includes a frame F, a shaft (not shown and almost the same as common fishing reel structures) mounted on the frame, a spool S fitted on the shaft to wind a fishing line, and first and second side covers C1 and C2 disposed at both sides of the frame, respectively.

A handle H is disposed through gear side cover, that is, the first side cover C1 and the first side cover C1 is disposed under a star drag nut that controls drag power to protect the fishing line by reducing the speed of the fishing line unwound from the spool when a fish flees with a hook in its mouth.

A palm side cover disposed at the opposite side to the first side cover, that is, the second side cover C2 has a well-known structure that generally can open to separate the spool.

One or both of the first and second side covers C1 and C2 have a mounting portion M for a decorative deco trim D and a drain W that are important parts of the fishing reel R equipped with a deco trim and a drain according to the present invention.

In order to fix the deco trim D to the mounting portion M, an adhesive, screws, an integrated type hook, or forcible fitting may be used.

When an adhesive is used, if the adhesive is wet with water, the adhesive force is decreased and the deco trim can be easily separated, so a replaceable deco trim cannot be used.

When screws are used, the number of parts is increased and corresponding portions should be formed at the deco trim or the side covers to hold the screws, so more spaces are occupied and the entire weight is increased.

When a hook is used, the elasticity of an integrated type hook is used, elasticity is decreased due to attachment/detachment using the elasticity, so the deco trim is separated as time passes.

However, when forcible fitting is used, deformation may be caused by heat that is generated by forcible fitting, the fitting pressure is difficult to control, and a replaceable deco trim cannot be used.

Accordingly, it may be possible to select appropriate types for fixing a deco trim but seawater inevitably flows in between side covers and a deco trim of conventional types during fishing, so the present invention proposes a plan to solve the problem of seawater remaining without being quickly discharged, whereby it corrodes the reel, the deco trim, the deco trim screws, etc., and as this phenomenon is repeated, salt is accumulated, so the deco trim separates and comes off.

In FIGS. 1A and 1B, a drain W for the first and second side covers C1 and C2 is disposed between the deco trim D and the first side cover C1 or the second side cover C2, and particularly, the drain W is formed in the shape of a groove on the first side cover C1 or the second side cover C2.

Figure 2A:
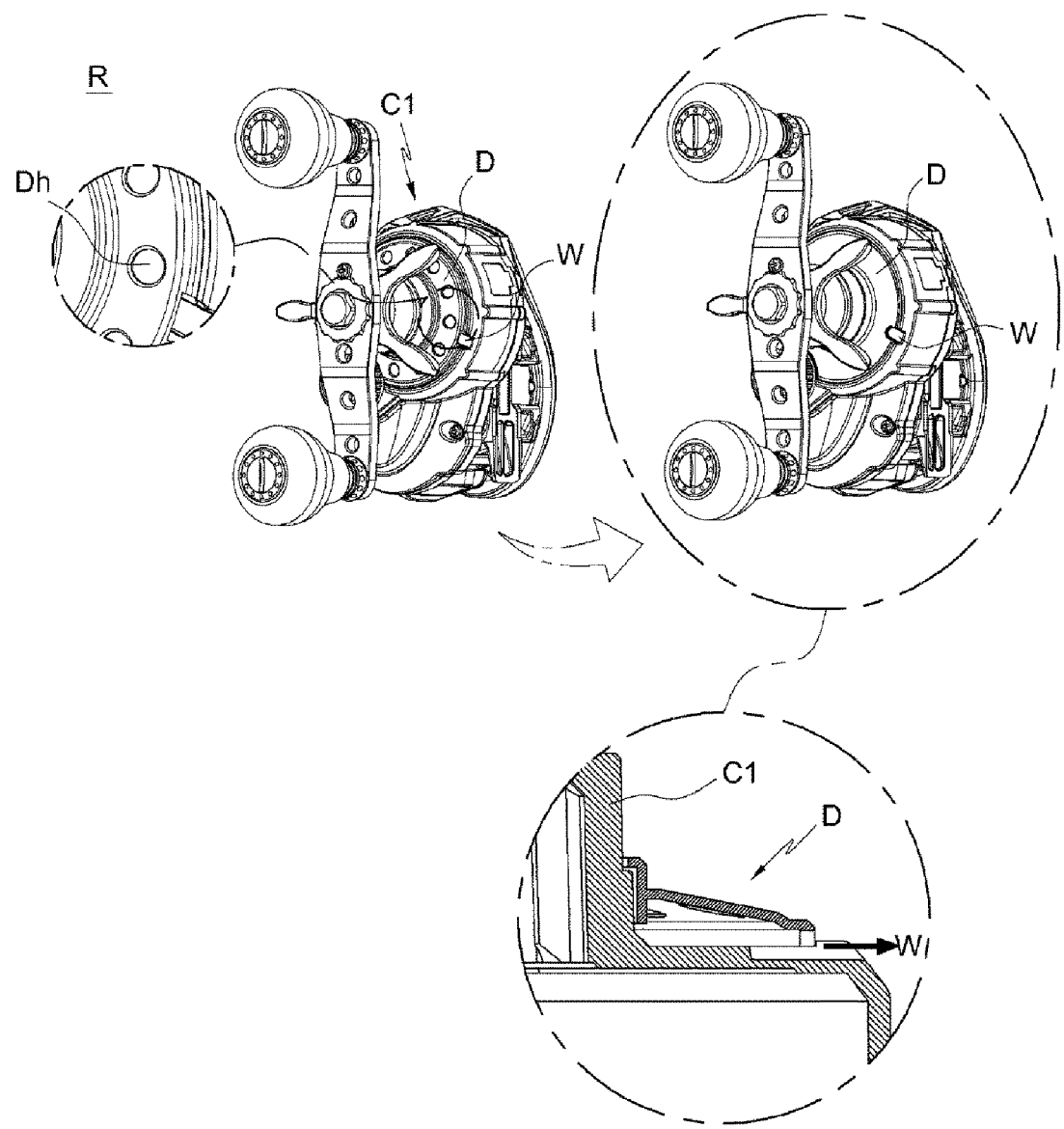
Figure 2B:
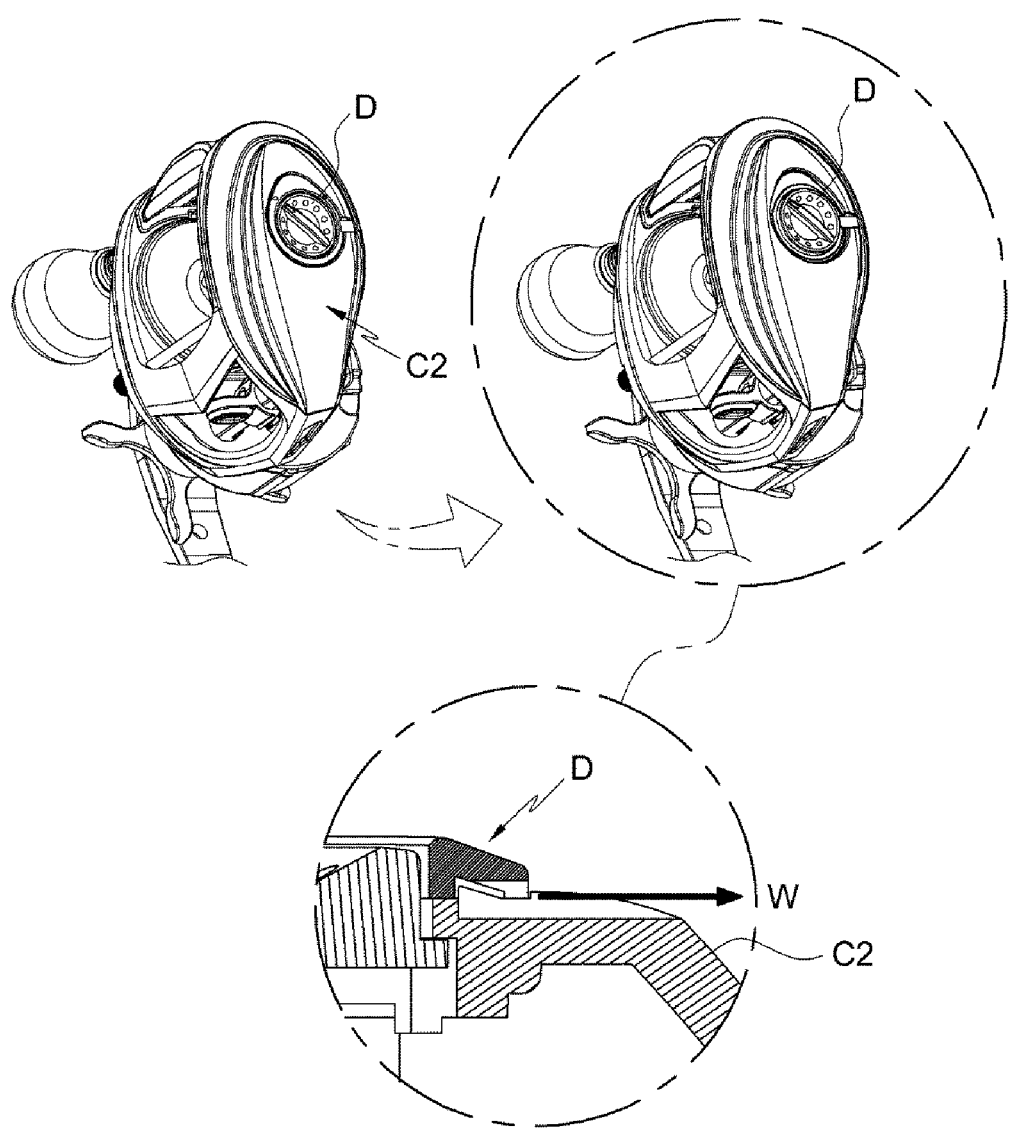

Further, in FIGS. 2A and 2B, a drain W for the first and second side covers C1 and C2 is disposed between the deco trim D and the first side cover C1 or the second side cover C2, and particularly, the drain W is formed in the shape of a groove on the corresponding contact side of the first side cover C1 or the second side cover C2.

Figure 3A:
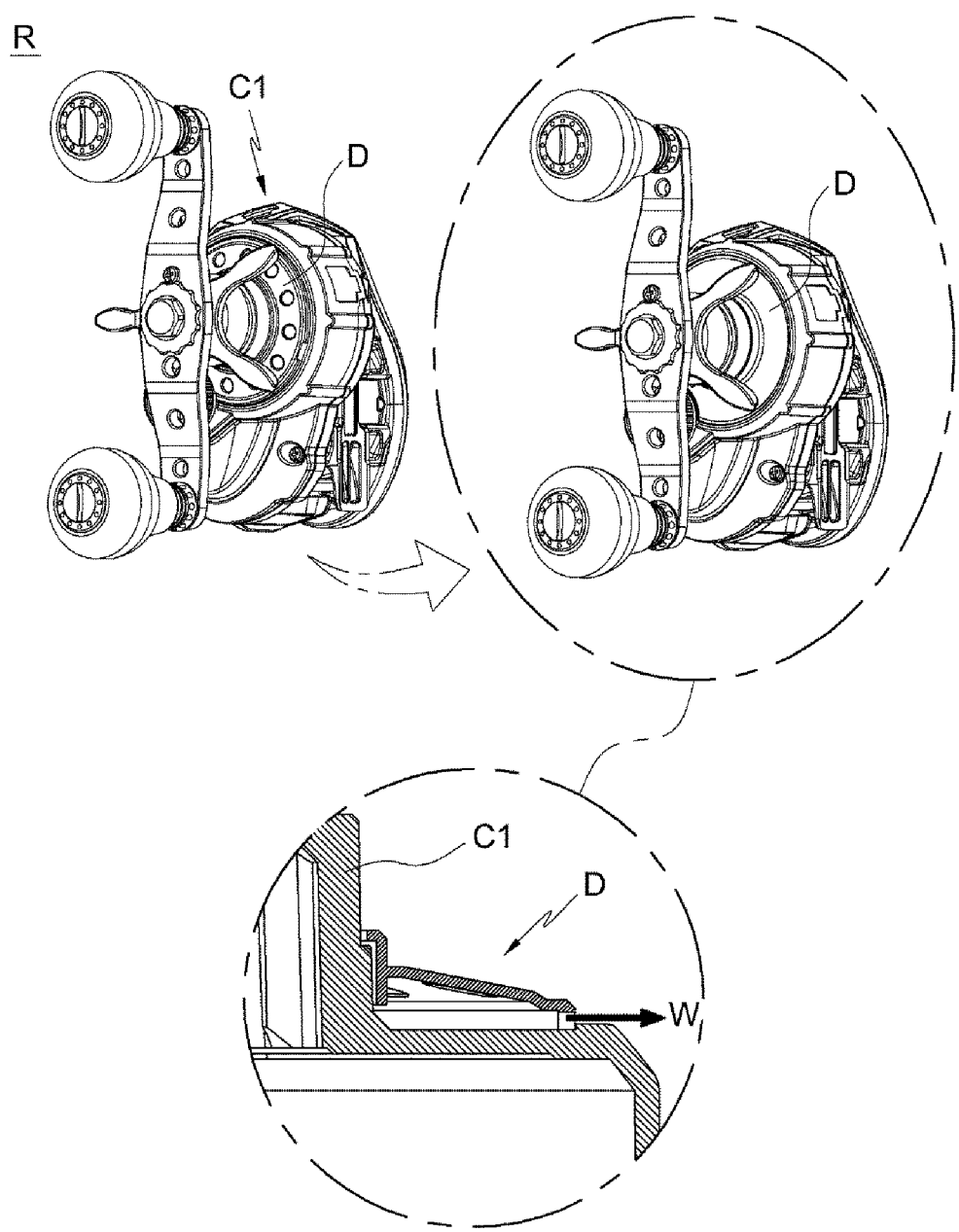
Figure 3B:
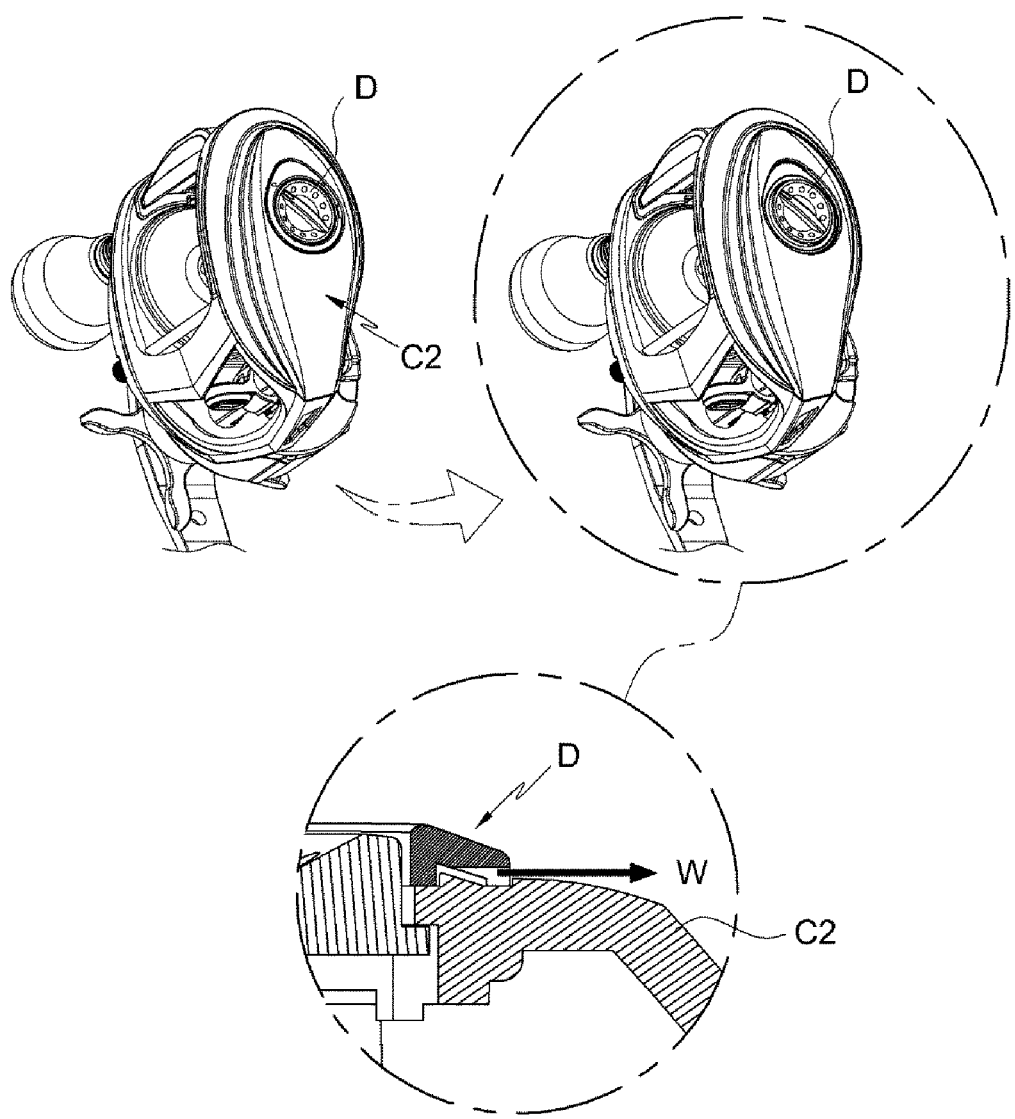

Next, in FIGS. 3A and 3B, a drain W for the first and second side covers C1 and C2 is disposed between the deco trim D and the first side cover C1 or the second side cover C2, and particularly, the drain W is formed in the shape of a groove on the deco trim.

Figure 4B:
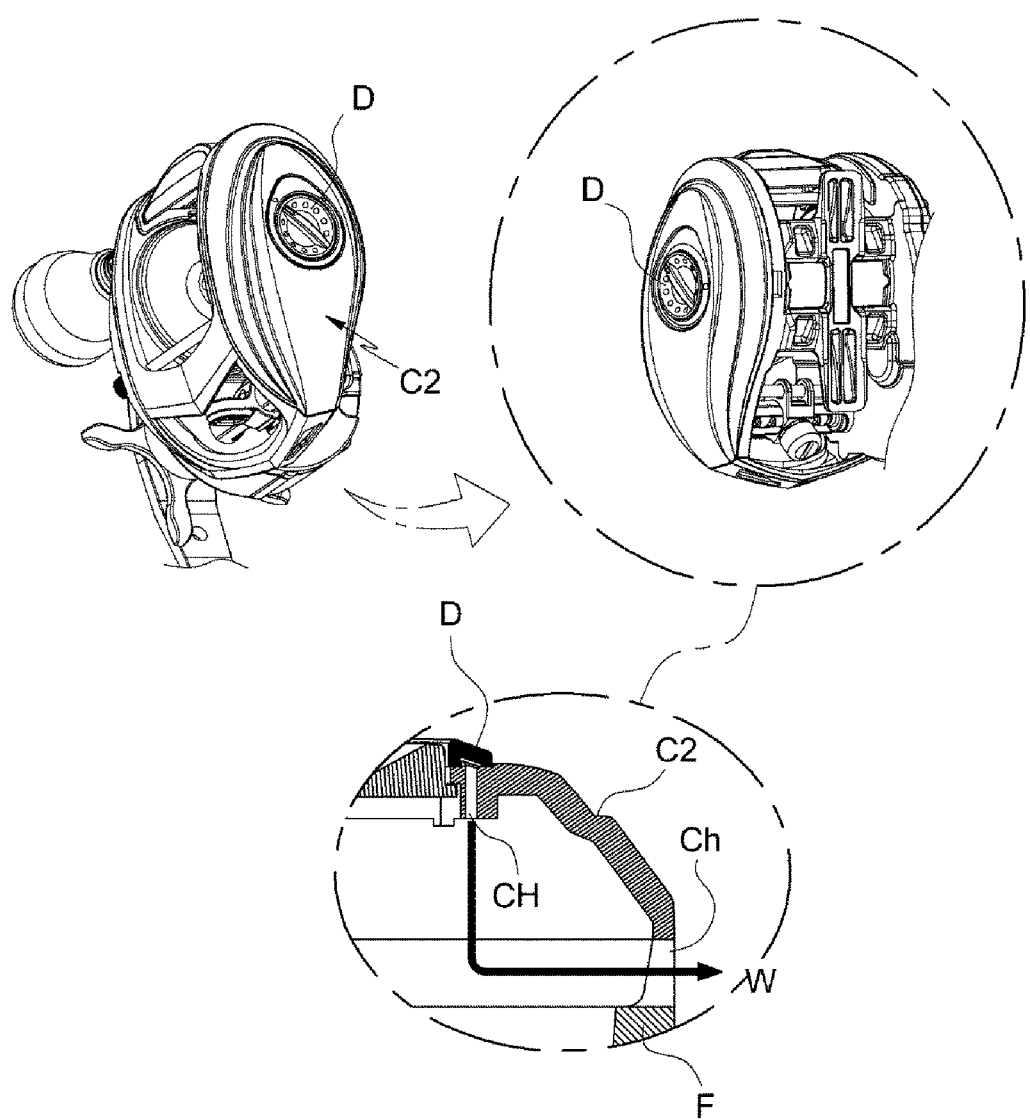

Finally, in FIGS. 4A and 4B, a drain W for the first and second side covers C1 and C2 is disposed between the deco trim D and the first side cover C1 or the second side cover C2, and particularly, the drain W extends to the contact side between the side covers and the frame F through the first side cover C1 or the second side cover C2.

To this end, the side covers each have a first hole CH formed under the deco trim and a second hole Ch formed through the contact sides of the side covers and the frame, so the drains extend from the first holes to the second holes.

Meanwhile, the first deco trims in FIGS. 1A, 2A, 3A, and 4A and the first and second deco trims in FIGS. 1B, 2B, 3B, and 4B have an external-air hole, particularly, a plurality of external-air holes Dh (see an enlarged view indicated by a dash-dotted line at the upper portion in the first perspective view in FIG. 2A), so even if seawater collects between the deco trims and the side covers and remains without being discharged through the drains W, external air can easily come in contact with the seawater, so seawater and washing water can be quickly dried.

The external-air holes Dh have various numbers, shapes, and sizes, so they can contribute to improving the decorative effect.

Further, since the deco trims D in FIGS. 1A to 4B have an inclined portion Dt declining toward the outer edge (see the reference numerals in the enlarged cross-sectional view of main parts in FIG. 1A), water outside the deco trims is naturally guided outside the side cover areas, thereby solving the problem due to inflow of seawater and assisting the effect of drains.

Meanwhile, in FIGS. 1A to 4B, the mounting portions M have a recessed portion M1 accommodating the outer edges Dr of the deco trims D, so it is possible to minimize the spaces between the deco trims and the contact sides of the side covers where salt accumulated by drying after seawater flows therein easily collects and to prevent the ends of the deco trim from separating from the tops of the side covers even if they minutely come off. Further, a curved portion De is formed at the ends of the deco trims D, so a section overlapping the recessed portion of the mounting portion is increased. Accordingly, even if the end of the deco trim is unavoidably lifted, it is possible to prevent the deco trim from completely separating from the tops of the side covers (see the reference numerals in the enlarged cross-sectional view of main parts in FIG. 1A).

Further, spaces DS are defined between the deco trims and the first or second side covers (see the reference numerals in the enlarged cross-sectional view of main parts in FIG. 1A).

The spaces are provided to ensure channels for the drains W and assist the drying function of the external-air holes Dh of the deco trims.

In relation to the spaces, the distance between the deco trims and the first or second side covers when they are combined may be average 0.2~2 mm in terms of draining and drying (the centers and outer ends of the deco trims may be in contact with the side covers).

Next, as can be seen from the cross-sectional views enlarging the main parts in FIGS. 1A, 2A, 3A, and 4A, the deco trims D each have a contact drum Dd being in contact with the outer side of a cylindrical portion in which the handle H of the first side cover C1 is fitted.

An end of the contact drum Dd has a curved portion Db that is locked to a locking step Cj formed on the cylinder of the first side cover C1 (see the reference numerals in the enlarged cross-sectional view of main parts in FIG. 1A).

The gap between two members is decreased by the contact drum Dd and the curved portion Db, so the effect of guiding the seawater to the drain W such that the seawater is not discharged between the cylinder of the first side cover C1 and the contact drum Dd is increased, and accordingly, it is possible to increase the effect of preventing seawater from contaminating and corroding other portions of the fishing reel R.

Similarly, as can be seen from the cross-sectional views enlarging the main parts in FIGS. 1A, 2A, 3A, and 4A, the inner end of the deco trim has a curved portion Db around a hole DH of the deco trim D for receiving a dial for opening and locking the second side cover C2.

The bottom of the curved portion Db is in contact with the top of a ring-shaped protrusion CC around an installation hole of the second side cover C2 where the dial is disposed, so it also contributes to guiding the entire seawater, that is, water to the drain W without contaminating or corroding other portions of the fishing reel R, if possible, (see the reference numerals in the enlarged cross-sectional view of main parts in FIG. 1B).

Although the configuration relating to fishing reels, particularly, a bait reel known in the art was not described above, those skilled in the art can easily estimate, infer, and implement the configuration.

Although a fishing reel which has a specific shape and structure was described above with reference to the accompanying drawing, the present invention may be changed and modified in various ways by those skilled in the art and those changes and modifications should be construed as being included in the scope of the present invention.

What is claimed is:

1. A fishing reel comprising:
   a frame;
   a shaft mounted on the frame;
   a spool fitted on the shaft to wind a fishing line;
   a first side cover disposed on one side of the frame;
   a second side cover disposed on the other side opposite to the one side of the frame;
   a deco trim attached to the first side cover, the deco trim having an annular shape and including an inner edge, an outer edge, and an inclined portion in-between;
   a mounting portion formed in the first side cover, the mounting portion including a locking step into which the inner edge is locked, and a recessed portion into which the outer edge is inserted, wherein a space is formed between the first side cover and the deco trim; and
   a drain groove formed along the outer edge of the deco trim in such a way that contents inside the space are drained out through the drain groove when the frame rotates.

2. The fishing reel of claim 1, wherein external-air holes are formed through the deco trim.

3. The fishing reel of claim 1, wherein the inner edge of the deco trim has a curved portion which is locked into the locking step of the mounting portion.

\* \* \* \* \*